United States Patent Office 3,505,077
Patented Apr. 7, 1970

3,505,077
PRODUCTION OF RECOMBINED CREAM
Arthur Bratland, Bergen, Norway, assignor to GAF Corporation, New York, N.Y., a corporation of Delaware
No Drawing. Continuation-in-part of application Ser. No. 479,294, Aug. 12, 1965. This application Dec. 29, 1965, Ser. No. 517,418
Claims priority, application Norway, Jan. 9, 1965, 156,279; Mar. 6, 1965, 157,083; Aug. 31, 1965, 159,543, 159,544
Int. Cl. A23c 9/00, 11/00, 13/12
U.S. Cl. 99—63       15 Claims

ABSTRACT OF THE DISCLOSURE

A recombined milk or cream is obtained by mixing together a low fat milk fraction, a high fat milk fraction and water. The low fat fraction includes skim milk and buttermilk or the low fat fraction obtained by concentrating a cream of at least 20% fat up to about 70% fat.

---

This application is a continuation-in-part of application Ser. No. 479,294, filed Aug. 12, 1965 and now abandoned.

This invention relates to milk products and a process for the production of such milk products. More particularly, the invention relates to whippable milk products.

As will be well known milk is the principal nutrient of the human being. Milk is, however, subjected to rapid deterioration when it is not processed for improving its keeping qualities. There are two important processes involved in the deterioration of milk. The low fat water soluble fraction may acidify by microbes acting upon the sugar and forming lactic acid. Secondly, the fat fraction may rancidify, which is caused by oxidation and hydrolysis.

In order to increase the keeping qualities of milk and milk products, genuine milk is separated into a high fat fraction (cream) with a fat content of about 35 percent, and a low fat fraction (skimmed milk) by centrifugation. The high fat fraction is further processed by churning into butter and buttermilk. The low fat fraction is normally concentrated either to form condensed milk or milk powder.

When it is desired to obtain a substitute for fresh whole milk, especially on board ship, even in places which are isolated for longer periods from access to daily supplies of fresh milk, such milk fractions are recombined. Quite generally, such recombination processes consist in making a low fat fraction either by diluting condensed skimmed milk or dissolving skimmed milk powder in the correct amount of water, whereupon fat is added to the fraction thus obtained and the mixture is thoroughly mixed together. In order to avoid too rapid separation of fat, the mixture is normally subjected to homogenisation, and, if desired, also pasteurisation. The mixture obtained thereby will have a flavor which is close to that of fresh milk.

In recent years, such recombination is so to say solely based upon the use of skimmed milk powder as the low fat milk fraction. Unsalted butter is normally used as the fat, but is is also possible to use other fats, if desired, for instance palm kernel oil.

Attempts have also been made to produce cream in this manner. Such recombined cream can, if it is produced from good raw materials, certainly have many of the properties of natural cream. and the flavour can even be very close to that of natural cream, but for various applications such recombined cream is, nevertheless, more different from the natural product than is the case with recombined milk.

It is usual practice during such recombination to add an emulsifier chosen among those which are permitted according to the food laws. The best known among these is glycerol monostearate which chemically is very strongly related to fat and which can, therefore, be tolerated in foodstuffs.

However, it appears that the properties of natural cream, for example in the production of whipped cream, will have completely disappeared in the recombined cream. Should one attempt to whip such recombined cream, a stiff product is certainly obtained, but this lacks the "short" consistency which is characteristic of cream whipped from natural cream.

Also recombined milk appears to be lacking certain properties for such special purposes, for example in the production of ice-cream having a low fat content, but this disadvantage is not so fully evident here, even if it will still be noticed by those who use recombined milk for such special purposes.

A long series of additives have hitherto been tried for meeting these disadvantages without success. However, it has been shown in tests carried out by the inventor, that these disadvantages can be overcome in a surprisingly simple manner.

According to the present invention, a process of producing a recombined cream product is obtained by mixing fat with a fluid produced from a dried milk powder and water, and homogenizing the mixture. The dried milk powder for the fluid is obtained by separating a genuine milk cream containing at least 20 percent by weight of butterfat into a high fat fraction with a fat content, for example, of about 35 percent and a low fat fraction (e.g. buttermilk), and by then adding the low fat fraction in an amount of about 5 percent to a low fat milk fraction (skimmed milk) obtained from the separation of milk into a high fat milk fraction (cream) of about 35 percent fat and a low fat milk fraction (skimmed milk).

According to one aspect of the present invention the low fat milk fraction used in the recombination of milk and cream comprises a first fraction consisting of skimmed milk and a second fraction consisting of buttermilk.

As is well-known buttermilk is the fluid which remains after churning. By experiments in the production of dried milk from this fluid, dried milk powder can certainly also be obtained, but on recombining this, a fluid results which may have peculiar taste, which in the pure state appears unpleasant to most people. There is a limited demand for fresh buttermilk, and this product today represents a by-product of lower commercial value for the dairies. Usually the milk suppliers (the farmers) have the opportunity to fetch such buttermilk low-priced so as to use it for fodder, an opportunity which only very few suppliers make use of. Neither is the buttermilk used especially as, for example, calf fodder.

It has also been shown from tests, firstly, that on recombining milk the addition of such buttermilk powder in smaller quantities can result in a lowering of the necessary amount of emulsifier, and secondly, the above-described differences between natural milk and recombined milk for special purposes disappear. The above-mentioned flavour does not, on the whole, appear to be generated any longer.

According to another aspect of the present invention, a product with a similar surprising effect of improving the whipping ability of recombined milk and cream may be obtained by a fractionating process involving the steps of first producing a conventional cream having a fat content of at least 20 percent and thereupon centrifugating this conventional cream further to a fat content of at least 40 percent. It has appeared that the low fat milk fraction obtained in this way also will improve the whipping ability of cream when used either alone or in admixture with conventional skimmed milk in the recombining process.

When manufacturing cream by means of the conventional types of centrifuges nowadays in use in the dairy industry, such centrifuges may be set to give cream having a desired fat content up to about 35 percent. However, it is also known that it is possible to obtain a higher fat content by using more advanced centrifuge constructions, but up to now such advanced equipment has been considered undesirable for use in the dairy industry. Since skimmed milk is a by-product, there is not much gained by the increase in recovery percentage of this fraction, and, moreover, cream having such high fat content tends to be very unstable, separating readily in butter and buttermilk fractions. In addition, power consumption increases considerably and the equipment is very expensive.

However, when further fractionating cream as explained above, a fraction will be obtained which because of its high value in a recombining process may make the use of such expensive equipment justifiable.

When using buttermilk or a buttermilk product such as buttermilk powder as addition, it should be kept in mind that buttermilk may vary in its properties all according to the process used in churning. Although it is most common to acidify the cream used for churning, since acidification assists in the churning process, some special uses and also some markets demand a less acid butter. The buttermilk obtained from churning a cream of low acidity is notably different from the more common buttermilk obtained when churning acidified cream.

Since the recombined cream used for shipping should normally be sweet cream, an acid buttermilk should be neutralised before use. This may be done simply by admixing acid buttermilk with a suitable amount of sweet skimmed milk or sweet buttermilk. In that case, the mixture should preferably be pasteurised to stop the acidification process. Even when no additional basic reacting materials have been added, such a mixture will not have any acid taste, and the weak acidification will assist in the whipping process to give a better whipping ability. However, it is also possible to add a neutralising agent such as calcium hydroxide, if desired.

The whipping ability of a recombined cream thus produced has appeared to vary. It has appeared that an acid buttermilk is far more effective in improving the whipping ability than sweet buttermilk, even after neutralisation.

Acid buttermilk may be concentrated by evaporation with or without neutralisation and made into buttermilk concentrate or powder. Even such concentrate or powder has shown to give better whipping ability than powder or concentrate made from sweet buttermilk.

In recombination, it may often be desirable to obtain cream having different content of fat. Thus, in the dairies, cream having a content of 12, 20, 25 and 35 percent fat are manufactured. It has appeared that the relative proportions between acid buttermilk, sweet buttermilk and skimmed milk has a marked influence upon the properties of the desired cream type. Thus, when making cream having a fat content of 35 percent, a suitable composition of the low fat milk fraction may be about 10 percent acid buttermilk, 40 percent sweet buttermilk and 50 percent skimmed milk, whereas the low fat milk fraction in a cream having a fat content of 25 percent may be 20 percent acid buttermilk, 30 percent sweet buttermilk and 50 percent skimmed milk. Should the former composition be used for a cream containing 25 percent fat, the product will not be readily whippable, while the latter composition when used for a cream containing 35 percent fat will be too easily whippable, so that a churning effect will be obtained instead.

Normally, it will be preferred to use a relationship between buttermilk and skimmed milk of about 1–1.

It will appear from the above considerations that the invention is based upon the discovery that buttermilk and related products contain ingredients which have a marked effect upon the properties of cream, particularly its whipping ability. Obviously, this discovery may be utilised in a number of ways for making whippable recombined cream. In general, this recombined cream must consist of three constituents: a fat constituent, a skimmed milk constituent, and a buttermilk constituent.

The fat constituent may consist of any type of fat. As indicated above, butter will be preferred in most cases, but other glyceride fats may be used, such as soya bean oil, palm kernel oil, coconut oil, or mixtures thereof. Also, a modified fat may be used. In ordinary cream, the fat content may vary from about 12 percent and upwards. Good whipping ability without further additions may be obtained from about 15 percent fat.

The skimmed milk constituent forms, together with the fat, the constituent imparting the desired taste to the product. Therefore, it is in general desired to keep the percentage of this constituent relatively high. On the other hand, however, a decrease in the content of skimmed milk constituent will not be much noticeable before this content is substantially decreased below 30–20 percent of the total low fat milk constituents present.

The skimmed milk constituent may be obtained in any convenient manner. In recombining processes it will mostly be preferred to dissolve the desired amount in water. However, concentrated skimmed milk may also be delivered as a concentrated liquid or paste, with a content of dry matter up to about 75 percent. In this case, only an addition of water is necessary. In some cases, skimmed milk may even be used as such, with its original content of dry matter, or slightly concentrated.

The buttermilk constituent is, as indicated above, the novel constituent in the recombined cream. This constituent may as mentioned consist of sweet buttermilk or acid buttermilk. Within the term "buttermilk" is also intended to incorporate a product obtained as the low fat fraction when concentrating cream from a content of 20 percent fat and up to an upper limit of about 70 percent. This latter possibility gives a product resembling sweet buttermilk in its ability to make recombined cream whippable.

The buttermilk constituent may be either genuine or concentrated. It is to be noted in this connection that the buttermilk has shown to possess the unique property that it may be boiled without developing undesirable taste, such as found in ordinary milk. Consequently, it is possible to subject buttermilk to a sterilisation process involving temperatures of 100° C. or higher, for obtaining a product which may be stored for months without deterioration. In this case, it will be preferred to concentrate the buttermilk by evaporation of water and filling the concentrated liquid into cans which are hermetically sealed and sterilised.

Another convenient buttermilk source may be obtained by making the buttermilk into powder. Such buttermilk powder has shown to be easily soluble in cold or lukewarm water.

Most preferably, the skimmed milk and the buttermilk constituents are in the form of a powder blend, formulated so as to give optimum results when dissolved in water and the necessary amount of fat added. However, it is not at all necessary to blend said constituents in beforehand.

The invention will now be illustrated by the following examples.

EXAMPLE 1

A recombined cream mixture was produced from a powder which consisted of one part of dried milk powder of the usual kind produced from skimmed milk, and one part of buttermilk powder, which was stirred during a homogenisation operation with a suitable amount of water. The buttermilk powder was produced by concentrating at about 45° C., and then subsequently spray drying. The mixture was mixed with 1 percent emulsifier in the form of glycerol monostearate, and 1 part of butter, whereupon the mixture was homogenised and then pasturised.

From this recombined whipping cream there was produced a whipped cream by whipping in the usual manner. The cream obtained had the same "short" consistency as a conventional whipped cream from natural cream, and the flavour was very close to that of natural whipped cream.

It must be emphasized that the relative amounts stated above between swimmed milk powder and buttermilk powder is purely by way of example, and that this proportion can be varied all according to what the product is to be used for. For example, in the production of coffee cream it would be natural to use more skimmed milk powder than that indicated here.

Further, it is noted that the emulsifier when incorporated in the mixture can be added in amounts of from 0.5 to 2.0 percent of the mixture prior to homogenisation.

EXAMPLE 2

A cream having a fat content of 30 percent was subjected to renewed centrifugation in special centrifugating equipment, whereby a cream fraction containing 65 percent fat in the form of an oil-in-water emulsion ("cream") and a low fat fraction ("skimmed milk") were obtained. The fat containing fraction was processed further to unsalted butter with a low acid content for use in a recombining process. The low fat fraction was dried in conventional equipment for the manufacture of skimmed milk powder.

The milk powder thus obtained was mixed with equal parts conventional skimmed milk powder and used in a recombining process for making recombined cream containing 20 percent butterfat. This cream was readily whippable and the whipped cream had exactly the same consistency and taste as whipped cream made from fresh cream having a fat content of about 30 percent.

EXAMPLE 3

A buttermilk powder was prepared from acid buttermilk after neutralisation with calcium hydroxide. 200 grams of this powder was mixed with 300 grams buttermilk powder obtained from sweet buttermilk by a simple drying process, and 500 grams of a conventional skimmed milk powder. The mixed powder was dissolved in 12 litres water and placed in a kettle equipped with a water jacket and a homogeniser. 4.3 kg. unsalted butter prepared in a "sweet" churning process, i.e. without acidifying the cream, was placed in the kettle and the mixture was homogenised while heating. After heating the mixture was pasteurised in known manner and cooled down.

The recombined cream thus obtained contained 25% fat and had an agreeable taste. It was whipped and had excellent whipping ability, giving a good overrun and but little serum formation. The taste of the cream could not be distinguished from that of ordinary whipped cream.

EXAMPLE 4

Example 3 was repeated with the exception that the fat content was increased to 30 percent by adding 5.5 kg. unsalted butter. The whipped cream thus obtained was considerably stiffer. When increasing the fat content to 35 percent by adding 7.0 kg. butter, the whipped cream had a churned consistency.

EXAMPLE 5

Example 3 was modified by mixing 150 grams acid buttermilk powder with 350 grams sweet buttermilk powder and 500 grams conventional skimmed milk powder. The mixed powder, totalling 1.0 kg., was dissolved in 12 litres of water. When adding 4.3 kg. butter, the cream was not readily whippable, the overrun was low and serum formation was high. A cream prepared with 5.5 kg. butter to a fat content of 30 percent was readily whippable and gave a satisfactory overrun and low serum formation. A cream containing 35 percent fat was even better than natural cream in overrun as well as low serum formation.

EXAMPLE 6

500 grams conventional skimmed milk powder was dissolved in 6 litres of water. In the kettle of Example 3 this recombined skimmed milk was admixed with 6 litres sweet buttermilk which had been sterilised by being subjected to 105° C. for 10 minutes in a closed autoclave and thereupon had been stored for two months in a closed container. No bacteria growth had been observed.

A cream was prepared by adding 5.5 kg. butter, homogenising and pasteurising. The mixture was readily whippable. It had a fat content of 30% by weight.

EXAMPLE 7

A sample of 36 litres acid buttermilk was neutralised with the necessary amount of calcium hydroxide and concentrated up to a concentration of 55% by weight of dry matter. The sample was divided into six equal parts.

One part was diluted after storage for two months to its original content of dry matter (about 8 percent), giving 6 litres buttermilk. This sample was added to 6 litres of fresh skimmed milk and 2.2 kg. palm kernel oil added thereto. After homogenisation and pasteurisation the cream was readily whippable, but gave a somewhat "light" whipped cream. The taste was satisfactory, and a comparison with the test now to be described did not at all reveal that palm kernel oil had been used instead of butter.

A second part was treated exactly as the first part, but 2.2 kg. butter was added instead of the palm kernel oil. There was no noticeable difference in the whipping properties of this cream, and the taste was equal to the whipped cream made from the first part.

A third part was again added to six litres of a skimmed milk prepared by dissolving the necessary amount of skimmed milk powder in water. 3.0 kg. palm kernel oil was added thereto and the mixture homogenised. The whipped cream was entirely satisfactory and had a pleasant taste. When used in pastry, a test panel consisting of twenty students could not distinguish this whipped cream from cream made from fresh cream having a fat content of 32 percent.

A fourth part was admixed with six litres skimmed milk prepared by dissolving the necessary amount of skimmed milk powder in water and 3.0 kg. butter was added thereto. After homogenisation the cream was whipped and the whipped cream tested. As such, there was a small difference in taste between the whipped cream consisting solely of milk products and the whipped cream containing palm kernel oil as the fat constituent, but this difference was not at all disagreeable. It could be concealed by an addition of vanillin or similar flavourant.

A fifth part was sterilised in an autoclave and stored for four months in a closed container at 25° C. There was no noticeable change in taste by this treatment. By whipping to cream of a fat content of about 20 percent, made by the procedure described above, no difference in whipping ability was observed. A similarly treated skimmed milk sample developed the well known taste of "boiled milk" after the same treatment.

A sixth part was pasteurised and stored at 25% C. After three weeks the sample was deteriorated although it has been stored in a closed container.

In the samples containing palm kernel oil as the fat constituent, serum formation was slightly higher than in the samples containing butterfat. This is not unexpected. In all cases however, serum formation is satisfactorily low.

What I claim is:
1. A process of producing cream consisting of the steps of
   obtaining a skim milk fraction from the separation of milk into a cream fraction of at least 35 percent butterfat and a skim milk fraction;

obtaining a low-fat fraction from the separation of a cream of at least 20 percent butterfat into a high fat fraction of at least 40 percent butterfat and a low fat fraction of less than 20 percent butterfat;

combining said skim milk fraction and said low fat fraction in a sufficient amount of water to produce a fluid mixture thereof;

mixing fat with the fluid produced in an amount sufficient to produce a cream having a fat content of from 18 to 35 percent fat; and homogenizing the mixture.

2. A process as set forth in claim 1 wherein 0.5 to 2 percent of an emulsifier is incorporated in the mixture prior to homogenisation.

3. A cream produced according to the process of claim 1.

4. A process of producing cream consisting of the steps of obtaining a dried milk powder containing a skim milk powder and a buttermilk powder, said skim milk powder being obtained from separating milk into a cream fraction of about 35 percent butterfat and a residual skim milk fraction and said buttermilk powder being obtained from churning a cream of at least 20 percent butterfat into butter and a residual buttermilk fraction;

adding water to said dried milk powder to produce a fluid mixture;

mixing fat with the fluid mixture in an amount sufficient to produce a foodstuff having a fat content of from 15 to 35 percent; and homogenizing the fluid mixture and fat.

5. A process as set forth in claim 4 wherein said fat is butterfat.

6. A process as set forth in claim 5 wherein approximately equal proportions of dried skim milk powder and buttermilk powder are used.

7. A process as set forth in claim 5 wherein 0.5 to 2 percent of an emulsifier is incorporated in the mixture prior to homogenisation.

8. A process as set forth in claim 4 wherein said buttermilk is a mixture of acid buttermilk and sweet buttermilk.

9. A process as set forth in claim 4 wherein said buttermilk constitutes between 35 and 65 percent of said dried milk powder.

10. A product made according to the process of claim 4.

11. A process of producing a cream having a fat content between 15 and 35 percent and the property of being whippable into whipped cream comprising the steps of mixing fat in an amount sufficient to provide the ultimate fat content desired in the cream with a fluid mixture produced from dried milk powder containing a proportion of dried buttermilk powder and water, and homogenising the mixture of fat and fluid mixture.

12. A process as set forth in claim 11 wherein said fat is butter.

13. A process as set forth in claim 11 wherein said dried milk powder contains equal proportions of skim milk powder and buttermilk powder.

14. A dried milk powder for use in a process for making whippable cream consisting of substantially equal proportions of skim milk powder and buttermilk powder.

15. A dried milk powder as set forth in claim 14 wherein said buttermilk powder consists of sweet buttermilk powder and acid buttermilk powder.

References Cited

UNITED STATES PATENTS

| | | | |
|---|---|---|---|
| 1,430,312 | 9/1922 | Merrell | 99—56 |
| 2,757,092 | 7/1956 | Zepp et al. | 99—136 X |
| 2,933,393 | 4/1960 | Ortman | 99—63 X |
| 2,934,441 | 4/1960 | Morgan et al. | 99—55 X |
| 3,126,283 | 3/1964 | Noznick et al. | 99—55 |

OTHER REFERENCES

Whittier et al.: Byproducts From Milk, Reinhold Pub. Corp., New York, 1950, pp. 3 and 5.

McDowall, F. H.: Buttermaker's Manual, New Zealand University Press, Wellington C.1, New Zealand, 1953, vol. II, p. 971.

LIONEL M. SHAPIRO, Primary Examiner

D. M. NAFF, Assistant Examiner

U.S. Cl. X.R.

99—55, 56, 60

PO-1050
(5/69)

UNITED STATES PATENT OFFICE
CERTIFICATE OF CORRECTION

Patent No. 3,505,077      Dated April 7, 1970

Inventor(s) Arthur Bratland

It is certified that error appears in the above-identified patent and that said Letters Patent are hereby corrected as shown below:

Column 1, lines 3 to 4, delete "assignor to GAF Corporation, New York, N.Y., a corporation of Delaware."

SIGNED AND
SEALED

OCT 27 1970

(SEAL)
Attest:

Edward M. Fletcher, Jr.
Attesting Officer

WILLIAM E. SCHUYLER, JR.
Commissioner of Patents